UNITED STATES PATENT OFFICE.

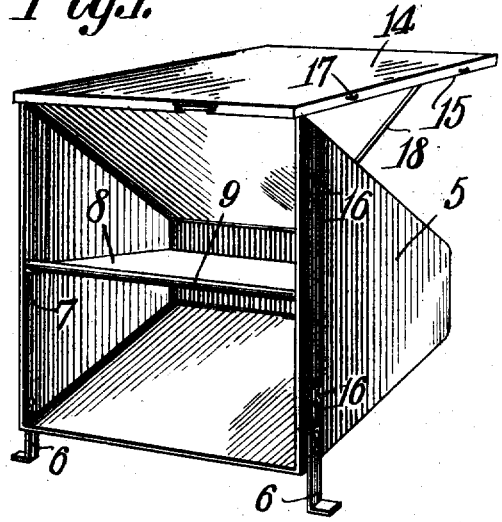
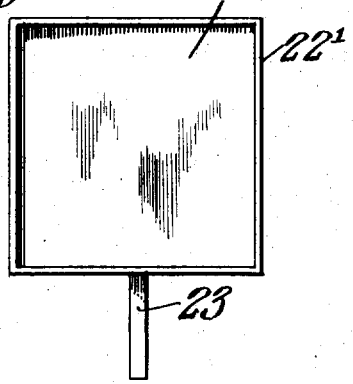
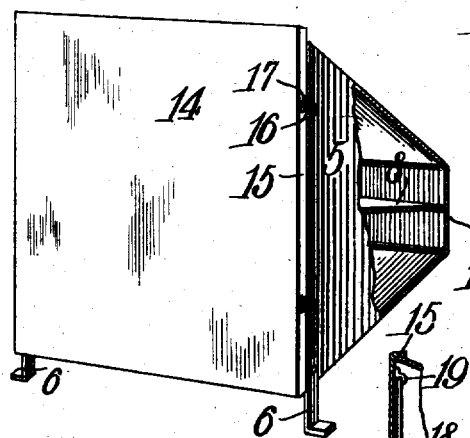

WILBURN CALAWAY GRANT, OF QUEEN CITY, TEXAS.

PORTABLE BAKER AND BROILER.

No. 897,459.

Specification of Letters Patent.

Patented Sept. 1, 1908.

Application filed November 9, 1907. Serial No. 401,477.

*To all whom it may concern:*

Be it known that I, WILBURN CALAWAY GRANT, a citizen of the United States, residing at Queen City, in the county of Cass and State of Texas, have invented a new and useful Portable Baker and Broiler, of which the following is a specification.

This invention relates to a combined bake oven and broiler and has for its object to provide a comparatively simple and inexpensive device of this character in which the heat is deflected laterally in contact with the meat, bread or other articles of food thereby insuring a rapid and uniform cooking of the food without exposing the latter to objectionable gases or fumes.

A further object of the invention is to provide the oven with a movable front plate or cover which, when in one position constitutes a table and in another position forms a closure for the open side of the oven so that the latter may be used as a cup-board.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a combined bake oven and broiler constructed in accordance with my invention showing the front plate or cover moved to horizontal position to form a supporting table. Fig. 2 is a similar view of the rear portion of the device. Fig. 3 is a perspective view showing the front plate or cover in closed position to form a cup-board. Fig. 4 is a plan view of the broiler detached. Fig. 5 is a vertical sectional view of Fig. 3.
Similar numerals of reference indicate corresponding parts in all of the figures of the drawings.

The portable oven forming the subject matter of the present invention comprises a casing or housing 5 preferably trapezoidal in shape and formed of metal or other suitable material, said casing having its rear end closed and its front portion open, as shown. Riveted or otherwise rigidly secured to the side walls of the casing are depending legs 6 provided with laterally extending feet which serve to support the bottom of the casing in elevated position above the ground. Projecting inwardly from the side walls of the casing are laterally extending brackets 7 which form a support for a removable tray or shelf 8. The tray or shelf 8 is designed to receive the loaves of bread when the device is used as a bake oven, said shelf or tray being provided with a vertically disposed flange 9 preferably extending the entire width of the tray, as shown. Secured to the rear wall 10 of the casing is a socket 11 in which is seated the rear supporting leg 12. The intermediate portion of the leg 12 is off set at 13 so as to bear against the lower inclined wall of the casing thereby to assist in sustaining the weight of the casing.

Combined with the casing or housing is a removable front plate 14 having a marginal flange 15 which bears against the adjacent walls of the casing or housing when the front plate is in the position shown in Fig. 3 of the drawings and thus forms a closure for the casing so that the latter may be used as a cup-board or receptacle for containing pots, pans and other cooking utensils. The front plate or cover 14 is locked in position on the casing by means of hooks 16 which engage suitable loops or eyes 17 secured to the flange 15 thereby to prevent accidental displacement of the casing during transportation or shipment. The front plate 14 is movable to horizontal position at the top of the casing or housing and in which position it constitutes a table for supporting cups, saucers and the like, as best shown in Fig. 1 of the drawings.

When the front plate or cover 14 is used as a table the front end of the cover is supported on the top of the casing while the rear end thereof is maintained in horizontal position by a depending bail or yoke 18 having its opposite ends pivotally mounted in suitable clips 19 secured to the inner face of the cover, as shown. The intermediate portion of the swinging bail or loop 18 is bent to form a loop or eye 20 which yieldably engages the interior walls of the socket 11 and thus serves to support the table in proper position on the casing.

Attention is here called to the fact that when the cover or front plate is used as a table the flange 15 of the cover bears against the upper transverse edge of the casing thus preventing the table from sliding downwardly and rearwardly on the upper inclined wall of said casing.

A handle 21 is also preferably secured to the upper inclined wall of the casing so that the casing may be conveniently transported from place to place. The intermediate portion of the handle is bowed outwardly in spaced relation to the adjacent walls of the casing and extends beneath and bears against the front plate or cover 14 when the latter is used as a table and thus assists in sustaining the weight of the articles upon the table.

When the device is used as a broiler the shelf or tray 8 is removed and a similar shelf or tray 22 placed in position on the supporting brackets 7. The tray or pan 22 is provided with a vertically disposed marginal flange 22' to prevent the escape of the juice from the meat during the broiling operation, said pan being also provided with a laterally extended handle 23 so that the same may be conveniently inserted within or removed from the oven.

When the oven is used for baking purposes the cover 14 is either entirely detached from the casing or supported in the position shown in Fig. 1 of the drawings after which the casing is moved to a point adjacent the fire so that the heat from the latter coming in contact with the converging upper and lower walls of the casing will be deflected downwardly in contact with the bread and thus thoroughly bake the same without exposing the same to objectionable fumes or gases.

In using the cover as a table said cover is reversed and placed in position on the upper portion of the casing with the flange 15 engaging the upper edge of the casing after which the bail is swung downwardly and the loop or eye 20 inserted in the socket 11.

When the oven is not in use the swinging bail 18 is detached from engagement with the socket 11 and said bail folded flat against the adjacent face of the cover after which the latter is placed in position on the front of the casing and secured thereto by means of the hooks 16, as best illustrated in Fig. 5 of the drawings and in which position the oven may be used as a cup-board or receptacle for storing different articles during transportation or shipment.

From the foregoing description it will be seen that there is provided an extremely simple, inexpensive and efficient device admirably adapted for the attainment of the ends in view.

Having thus described the invention what is claimed is:

1. A device of the class described comprising a casing having an open front, and a closure for the front of the casing and movable to horizontal position above the casing to form a table.

2. A device of the class described comprising a casing having an open front, a plate constituting a closure for the front of the casing and movable to horizontal position above the casing to form a table, and a bail depending from the plate and engaging the casing for supporting the rear end of said plate when supported above the casing.

3. A device of the class described comprising a casing having an open front and provided with a socket, a plate constituting a closure for the front of the casing and movable to horizontal position above the casing to form a table, and a bail pivotally secured to one end of the plate and adapted to engage the socket for supporting said plate in horizontal position.

4. A device of the class described comprising a casing having an open front and provided with forward depending supporting legs, a socket secured to the rear wall of the casing, a rear supporting leg seated in said socket, a plate forming a closure for the open end of the casing and movable to substantially horizontal position to form a table, and a bail secured to the plate and adapted to engage the walls of the socket when said plate is moved to horizontal position.

5. A device of the class described comprising a substantially trapezoidal casing having an open front and provided with inwardly extending brackets, a removable tray supported on said brackets and having a vertically extending flange, spaced depending supporting legs secured to the casing at the front end thereof, a socket secured to the rear end of the casing, a rear supporting leg engaging the socket and having its intermediate portion off set for engagement with the adjacent inclined wall of the casing, a cover forming a closure for the front of the casing and movable to substantially horizontal position to form a table, and a supporting bail pivotally secured to the cover and engaging the socket for supporting the cover in horizontal position.

6. A device of the class described comprising a casing having an open front, a plate constituting a closure for the open end of the casing and movable to substantially horizontal position above the casing to form a table, means for locking the plate in engagement with the side walls of the casing, and means for supporting the plate in horizontal position.

7. A device of the class described comprising a casing having an open front, a plate forming a closure for the open front of the casing and provided with a marginal flange, said plate being movable to horizontal position with the flange in engagement with the upper edge of the casing to form a table, clips secured to one side of the plate, a socket secured to the rear wall of the casing, a bail pivotally mounted in said clips and having its intermediate portion bent to form an eye adapted to enter the socket for supporting the plate in substantially horizontal position, loops secured to the flange, and hooks carried by the casing and adapted to engage the loops for locking the plate in engagement with said casing when the latter is used for closing the open end of the casing.

8. A device of the class described comprising a substantially trapezoidal casing having an open front, a plate constituting a closure for the open front of the casing and movable to horizontal position to form a table, a socket secured to the rear wall of the casing, a bail pivotally mounted on the front plate and adapted to engage the socket for supporting the plate in horizontal position, and a supporting handle secured to the upper wall of the casing and having its intermediate portion bowed and bearing against the plate to assist in supporting said plate in horizontal position.

In testimony that I claim the foregoing as my own, I have hereto affixed my signature in the presence of two witnesses.

WILBURN CALAWAY GRANT.

Witnesses:
JAS. E. HUTCHISON.
S. V. BAKER.